(12) United States Patent
Glass et al.

(10) Patent No.: US 6,652,295 B1
(45) Date of Patent: Nov. 25, 2003

(54) GROUND BUS FOR JUNCTION BOX

(76) Inventors: Maris Anthony Glass, 311 Kurtz Ave., York, PA (US) 17403; Sam Denovich, 5310A Manayung Rd., Harrisburg, PA (US) 17109; James Shannon Hower, 525 Harvest Dr., Harrisburg, PA (US) 17111

( * ) Notice: Subject to any disclaimer, the term of this patent is extended or adjusted under 35 U.S.C. 154(b) by 0 days.

(21) Appl. No.: 08/861,547

(22) Filed: May 22, 1997

Related U.S. Application Data

(63) Continuation-in-part of application No. 08/808,301, filed on Feb. 28, 1997.

(51) Int. Cl.[7] .................................................. H01R 4/66
(52) U.S. Cl. .......................................... 439/94; 439/92
(58) Field of Search ................................. 379/399, 397; 439/92, 91, 84, 83, 85, 94, 95

(56) References Cited

U.S. PATENT DOCUMENTS

| | | | | |
|---|---|---|---|---|
| 4,367,909 A | * | 1/1983 | Shatto, Jr. et al. | 439/497 |
| 4,408,823 A | * | 10/1983 | Huber | 439/465 |
| 4,681,382 A | * | 7/1987 | Lockhard | 439/92 |
| 4,945,559 A | | 7/1990 | Collins et al. | 379/399 |
| 4,945,560 A | | 7/1990 | Collins et al. | 379/399 |
| 4,949,376 A | | 8/1990 | Nieves et al. | 379/399 |
| 4,993,959 A | * | 2/1991 | Randolph | 439/92 |
| 5,094,622 A | * | 3/1992 | Auclair | 439/92 |
| 5,129,844 A | | 7/1992 | Goto et al. | 439/778 |
| 5,312,266 A | | 5/1994 | Daoud | 439/304 |
| 5,313,519 A | | 5/1994 | Mickelson et al. | 379/399 |
| 5,333,193 A | | 7/1994 | Cote et al. | 379/399 |
| 5,359,654 A | | 10/1994 | Jensen et al. | 379/397 |
| 5,378,174 A | | 1/1995 | Brownlie et al. | 439/709 |
| 5,394,466 A | | 2/1995 | Schneider et al. | 379/399 |
| 5,410,596 A | | 4/1995 | Shannon et al. | 379/412 |
| 5,416,837 A | | 5/1995 | Cote et al. | 379/399 |
| 5,441,417 A | * | 8/1995 | Landouceur et al. | 439/84 |
| 5,570,422 A | | 10/1996 | Napiorkowski et al. | 379/399 |
| 5,630,735 A | | 5/1997 | Eckert | 439/721 |
| 5,645,447 A | | 7/1997 | Sandor | 439/467 |
| 5,674,079 A | | 10/1997 | Auclair | 439/92 |
| 5,681,191 A | * | 10/1997 | Robicheau et al. | 439/877 |

\* cited by examiner

*Primary Examiner*—Daniel S. Hunter
*Assistant Examiner*—Charles N. Appiah

(57) ABSTRACT

Ground bus (50) including a body section (48) having a plurality of apertures (52) for grounding of a like plurality of modules (16). Ground bus (50) is mountable in an enclosure (10) and includes an integral termination section (62) whereinto an external ground conductor is inserted to be compressed by a terminal (56) against the body section (48) for quickly establishing a ground connection.

5 Claims, 4 Drawing Sheets

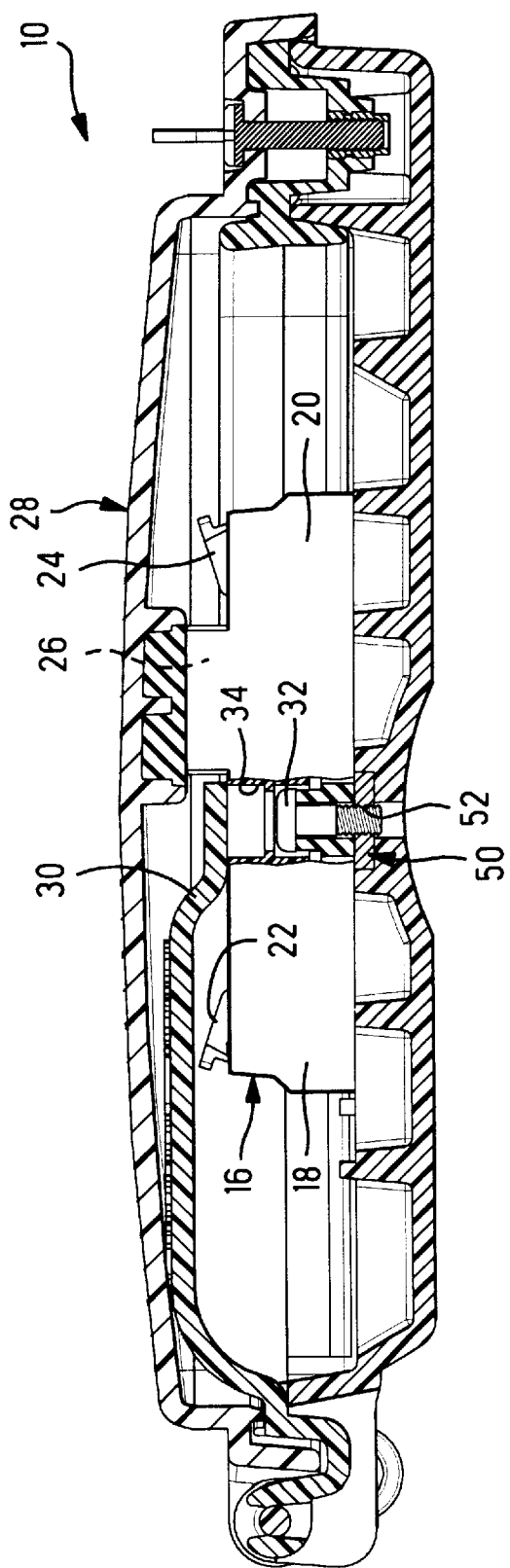
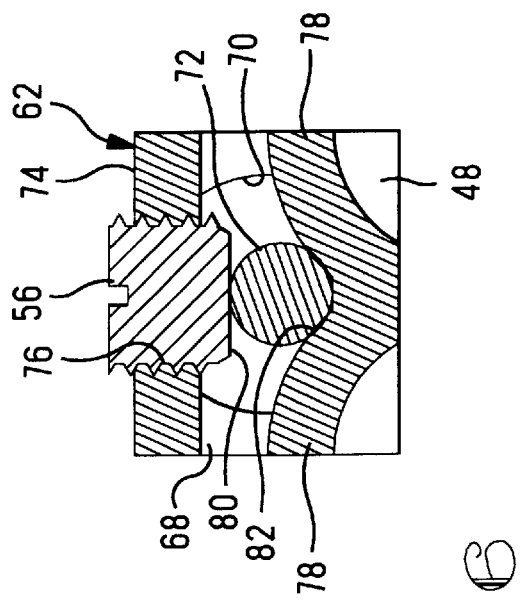
FIG. 4
FIG. 6

GROUND BUS FOR JUNCTION BOX

RELATED APPLICATION INFORMATION

This a Continuation-in-Part of U.S. patent application Ser. No. 08/808,301 filed Feb. 28, 1997.

FIELD OF THE INVENTION

The present invention is in the field of electrical connections and more particularly in grounding of junction boxes.

BACKGROUND OF THE INVENTION

Certain enclosures for interconnections of signal transmission cables from distribution cables to premise wiring, are known as "Network Interface Devices," or NIDs, in which the paired signal transmission wires are interconnected to associated paired premise wires in respective modules. The modules include therein circuit boards having overvoltage protection components thereon whose ground leads require grounding. Grounding of cable shields and the interconnection modules is known to be provided by grounding posts mounted in the enclosures to which discrete ground wires extending from the modules are fastened. One such enclosure is disclosed in U.S. patent application Ser. No. 08/808,301 filed Feb. 28, 1997 and assigned to the assignee hereof. A row of modules is mounted in the NID each for termination to associated distribution cable conductors and termination of premise wires to circuitry of the module for interconnection. The wire termination end is secured within a portion of the NID accessible only to utility service personnel, and the other end having a test port accessible by the customer for testing the integrity of the customer's premise wiring circuit. The modules are fastened to a ground bus traversing the base of the enclosure which also establishes a ground connection therewith for grounding the circuit element of the module.

It is desired to provide for simplified grounding of the ground bus with an external ground.

SUMMARY OF THE INVENTION

The ground bus of the present invention establishes ground connections of a plurality of interconnection modules and the cable shield. The ground bus is adapted to easily provide for interconnection with a ground wire extending from the junction box to external ground.

An embodiment of the invention will now be described by way of example with reference to the accompanying drawings.

BRIEF DESCRIPTION OF THE DRAWINGS

FIG. 4 is a cross-sectional view of the junction box of FIG. 1 illustrating a module fastened and grounded to the ground bus of FIGS. 1 to 3;

FIG. 6 is a cross-sectional view of a ground wire terminated to the ground bus.

DETAILED DESCRIPTION OF THE EMBODIMENT

Figure 1:
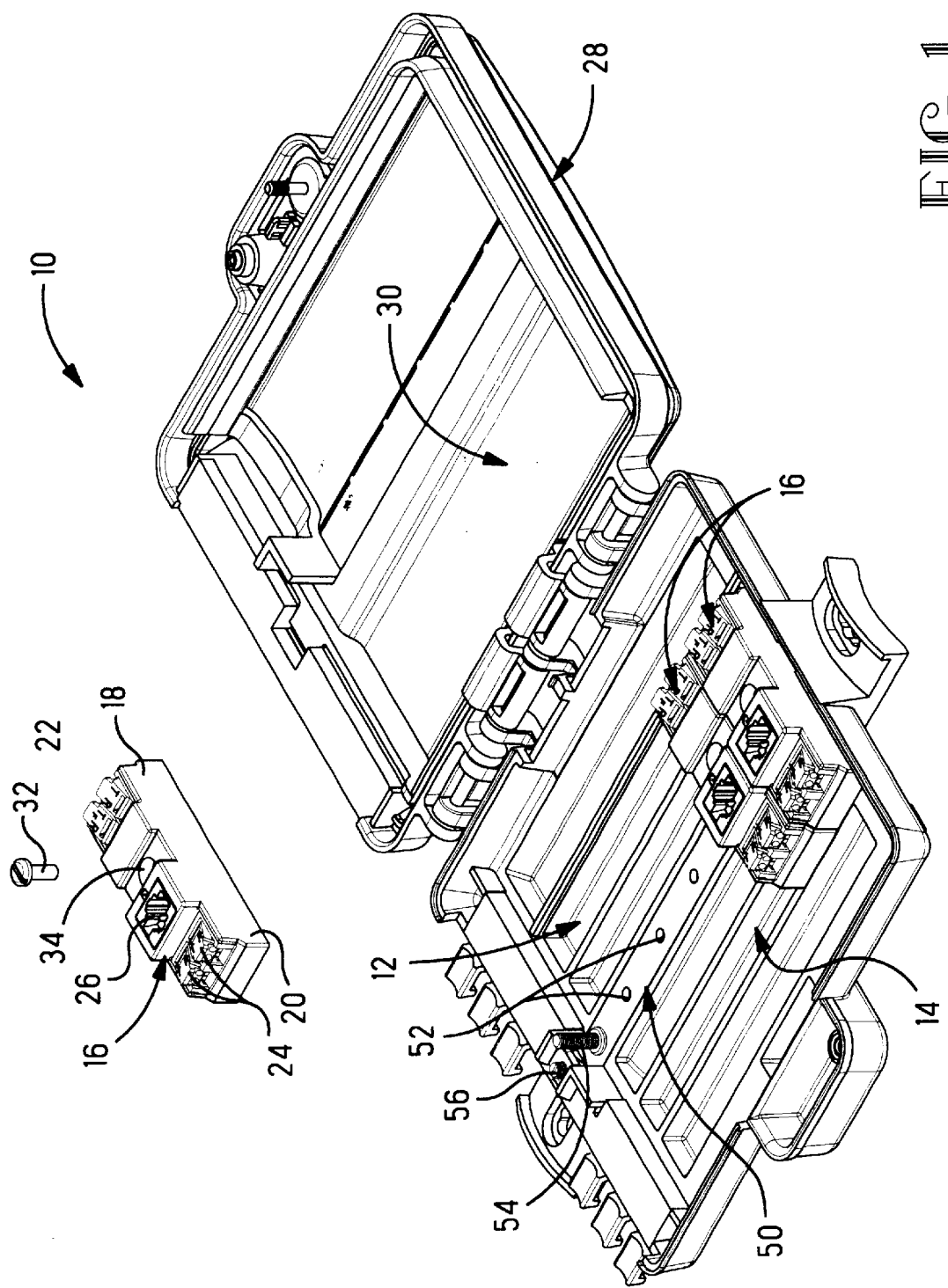
FIG. 1 is an isometric view of a junction box with several interconnection modules mounted therein and grounded to the ground bus of the invention, and one exploded therefrom.
Figure 2:
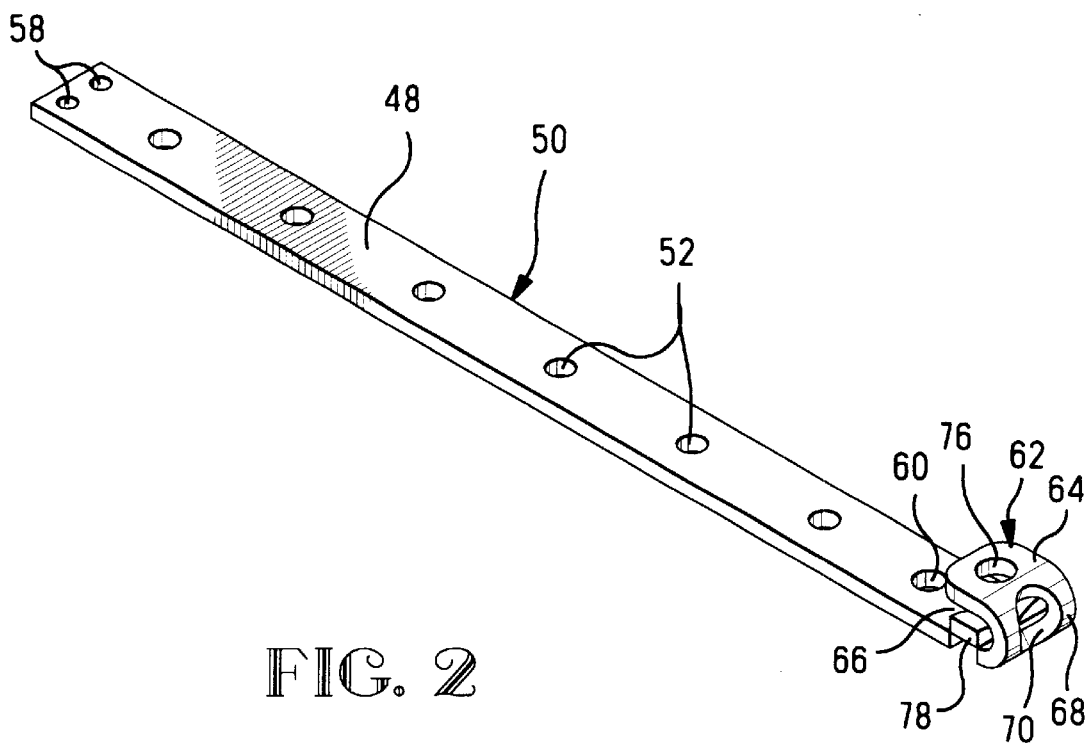
FIGS. 2 and 3 are isometric views of the ground bus of FIG. 1.
Figure 3:
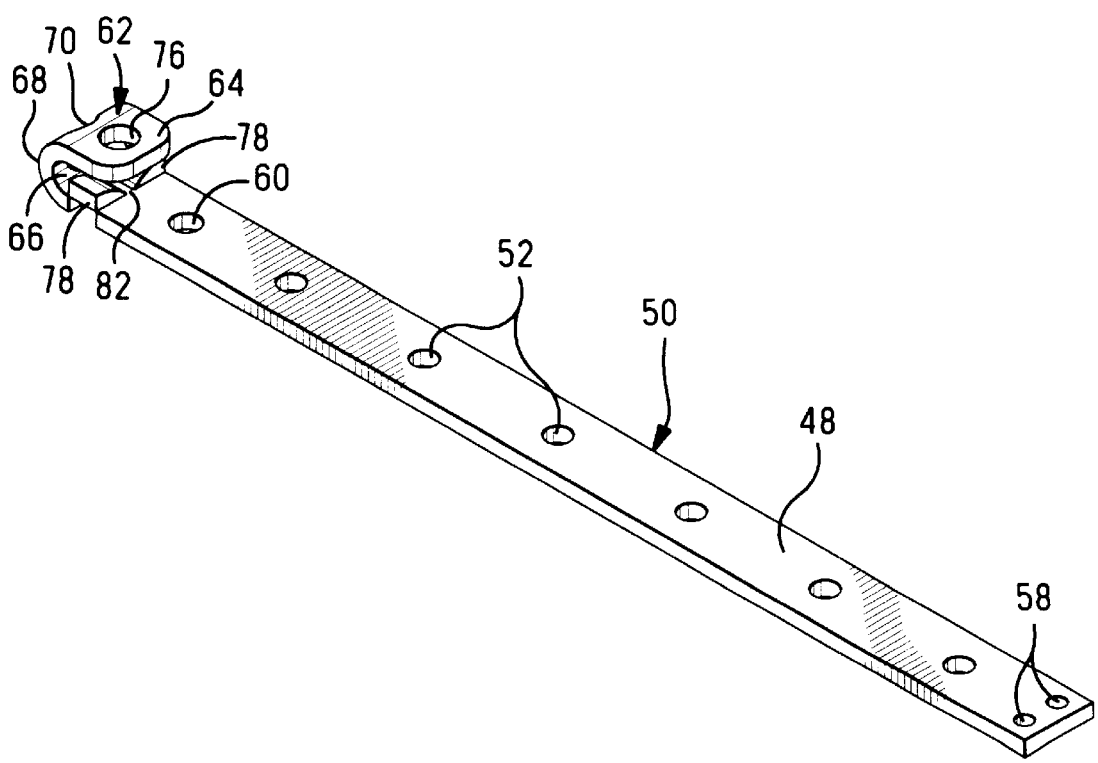

Enclosure 10 is an NID, having a utility portion 12 and a customer portion 14, with a plurality of modules 16 straddling the barrier for a service end 18 to be accessible only within the utility portion 12, and the customer end 20 accessible in the customer portion 14. Service end 18 is seen to include a pair of termination sites 22 providing for insertion of tip and ring conductors of the distribution cable (not shown) and termination thereof to circuits within the module, while customer end 20 is seen to include a pair of termination sites 24 providing for insertion of tip and ring conductors of the premise wiring cable (not shown) and termination thereof to the module circuits; customer end 20 also includes a test port 26 for customer testing of the integrity of the premise wiring. Lid assembly 28 is adapted to be unlocked and opened both by service personnel and by a particular customer for access to the customer portion 14 and customer ends 20 of modules 16, while an interior lid 30 is adapted to be unlocked and opened only by service personnel.

Ground bus 50 is mounted in enclosure 10 along the bottom thereof near the boundary between customer portion 14 and utility portion 12. Each module 16 is secured in the enclosure by a bolt 32 extending through hole 34 of the module that is threaded into a respective threaded aperture 52 in ground bus 50. Ground stud 54 is positioned proximate one end of ground bus 50 for termination thereto by wire wrapping of a drain wire of the distribution cable ground shield (not shown). Terminal 56 is affixed at an end of ground bus 50 for terminating thereto an external ground conductor.

Figure 5:
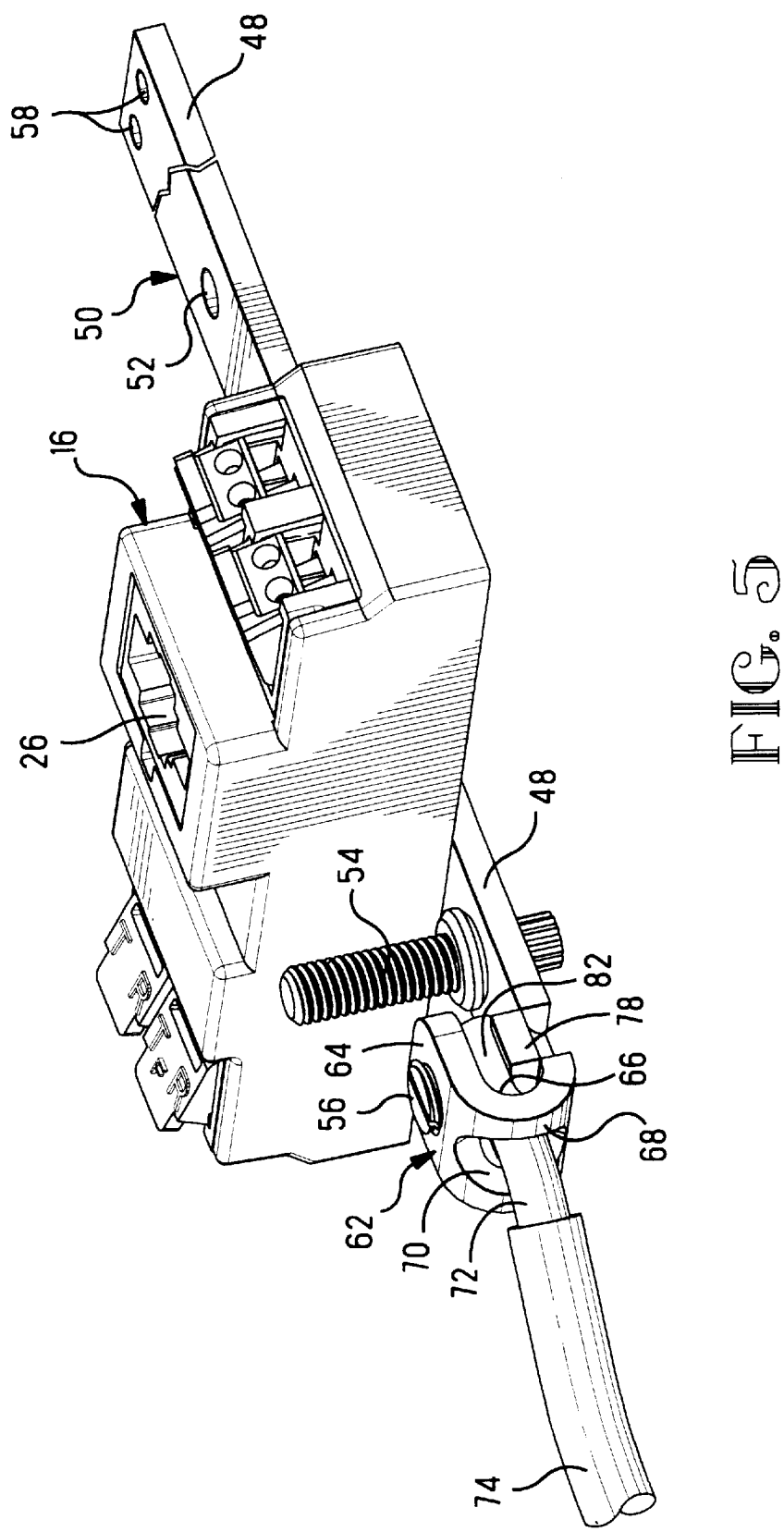
FIG. 5 is an isometric view of a module mounted onto the ground bus of FIGS. 1 to 4.

In FIGS. 2 to 5 is shown ground bus 50 having a body section 48, module-associated threaded apertures 52, mounting apertures 58, ground stud aperture 60 and terminating portion 62 that is the present invention. In FIGS. 4 and 5 is seen a module 16 mounted to ground bus 50 by a bolt 32. Lid assembly 28 is seen secured in a closed position to enclosure 10 in FIG. 4, and interior lid section 30 is also seen to be in its closed position covering utility portion 12.

Best seen in FIGS. 5 and 6, terminating portion 62 of the ground bus of the present invention includes a tab 64 doubled back partially along the ground bus and spaced therefrom to define a conductor-receiving region 66, and being joined to body section 48 by a bight section 68 preferably having a conductor-receiving hole 70 into which is insertable a stripped end portion 72 of an external ground conductor 74. A terminal-receiving aperture 76 is formed in tab 64 and opposing a portion of the body section, for threading thereinto of terminal 56. A pair of wings 78 are stamped from the ground bus opposing terminal-receiving aperture 76 and define a conductor nest or groove 80 inwardly of conductor-receiving hole 70. Upon insertion of conductor end 72 through conductor-receiving hole 70, terminal 56 is threaded for its leading end 80 to compress conductor end 72 into conductor nest 82 firmly against wings 78 preferably sufficiently to secure it in position, as seen in FIG. 6, and to establish an assured ground connection between conductor 74 and ground bus 50.

Ground bus may be made for example from brass having a thickness of about 0.100 in into an elongate strip into which are formed wings 78 and are punched holes 52, 58, 60, 70 and 76, after which holes 52 and 76 are then threaded. Conductor-terminating region 62 is then formed by tab 64 being carefully bent outwardly and back to be parallel to and spaced from body section 48, in a manner not disturbing threaded hole 76. During mounting of ground bus 50 into enclosure 10, holes 58 received upwardly therethrough respective plastic towers (not shown) after which protruding ends of the towers are heat staked over the top surface of body section 48. Termination post 54 may be secured in hole 60 such as by being force fit downwardly thereinto.

The present invention is a ground bus having an integral conductor-terminating region, enabling establishing of an external ground connection with minimal effort of service personnel.

What is claimed is:

1. A ground bus, comprising:

a body section having a plurality of grounding sites therealong, and a conductor termination site formed to include a tab integral with said body section and spaced a selected distance therefrom to define a conductor-receiving region therebetween, and having a terminal-receiving aperture orthogonal to said conductor-receiving region and opposing a portion of said body section and being adapted for receipt therethrough and retention therein of a terminal inserted toward said body section portion, whereby a terminal extending through said terminal-receiving aperture engages a conductor disposed in said conductor-receiving region to compress said conductor against said body section to define a ground connection therewith.

2. The ground bus as set forth in claim 1 wherein said termination site includes a conductor-receiving hole through a bight section joining said tab to said body section and aligned with said conductor-receiving region.

3. The ground bus as set forth in claim 1 wherein wings are formed along said body section opposed from said terminal-receiving aperture defining a conductor nest therebetween.

4. A ground bus, comprising:

a body section having a plurality of grounding sites therealong, a conductor termination site formed to include a tab integral with said body section and spaced a selected distance therefrom to define a conductor-receiving region therebetween, and having a terminal-receiving aperture orthogonal to said conductor-receiving region and opposing a portion of said body section, and a terminal inserted through said terminal-receiving aperture toward said body section portion and movable with respect thereto, whereby the terminal is movable to engage a conductor disposed in said conductor-receiving region to compress said conductor against said body section to define a ground connection therewith.

5. The ground bus as set forth in claim 4 wherein said terminal is threaded.

* * * * *